United States Patent Office 2,898,362
Patented Aug. 4, 1959

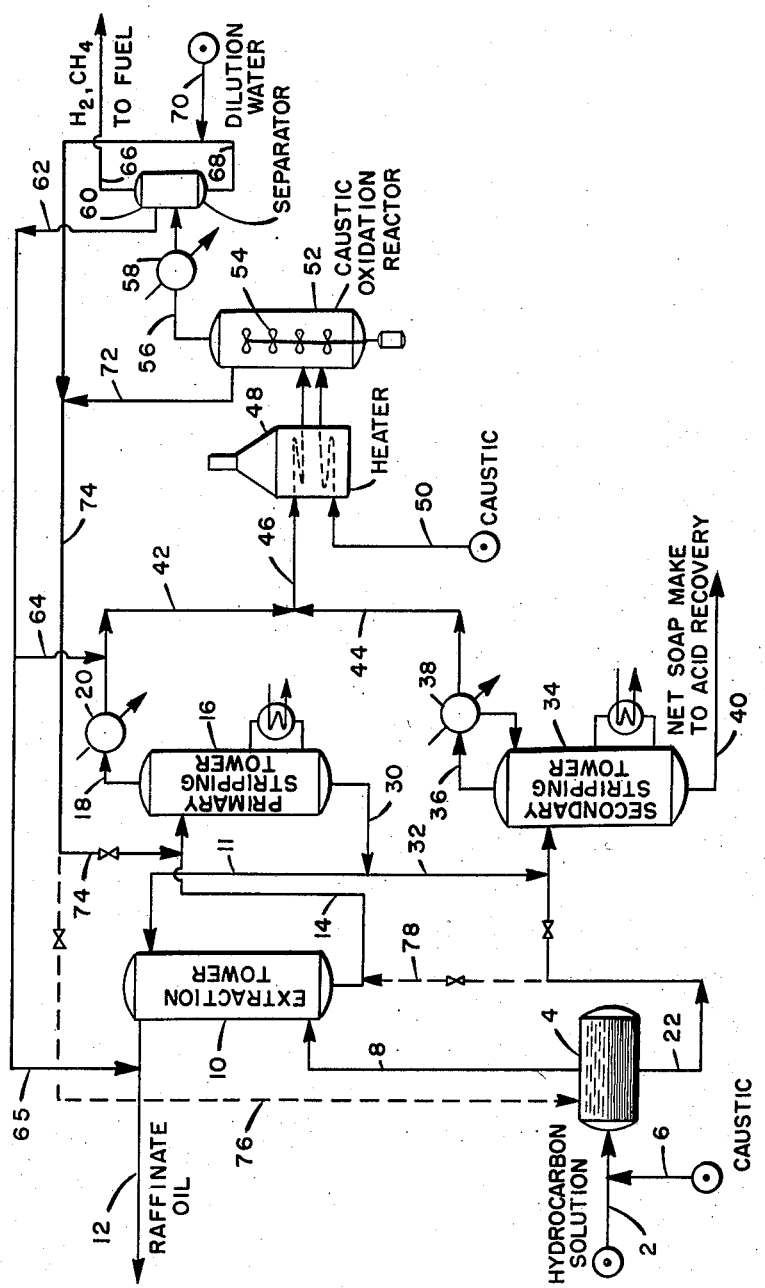

2,898,362

RECOVERY OF CHEMICALS FROM HYDROCARBON SOLUTIONS

Clifton S. Goddin, Jr., and James F. Magness, Tulsa, Okla., assignors to Pan American Petroleum Corporation, Tulsa, Okla., a corporation of Delaware Application May 13, 1957, Serial No. 658,770

12 Claims. (Cl. 260—450)

The present invention relates to a novel method for recovering oxygenated organic chemicals from hydrocarbon solutions thereof. More particularly, it is concerned with an improved procedure for recovering both acid and nonacid organic chemicals from their hydrocarbon solutions in which the nonacid component is converted to acids and the entire chemical portion of the solution recovered in the form of carboxylic acids or the salts of such acids.

Hydrocarbon solutions of chemicals are frequently encountered in the process industries. For example, the product produced in the partial oxidation of hydrocarbons ordinarily contains a wide variety of oxygenated organic compounds together with unreacted hydrocarbons. Another example of such mixtures is the product obtained by the reduction of carbon monoxide with hydrogen in the presence of a suitable catalyst. Mixtures of this type, in addition to containing both saturated and unsaturated hydrocarbons, include carboxylic acids, ketones, aldehydes and alcohols. For example, in a hydrocarbon synthesis plant designed to produce 6,000 barrels per day of liquid hydrocarbons, there are produced 317,000 pounds per day of oil-soluble chemicals. The distribution of these chemicals in the oil stream breaks down as follows: 108,000 pounds of carbonyl compounds, 93,000 pounds of alcohols, 84,000 pounds of acids and about 32,000 pounds of esters. Owing to their value as chemicals it is desirable to separate these oxygenated compounds as completely as possible from the oil stream.

In recovering oil-soluble chemicals from hydrocarbon solutions thereof such as, for example, hydrocarbon solutions of the type produced by the reaction of carbon monoxide with hydrogen at elevated temperatures and pressures in the presence of a fluidized alkali promoted iron catalyst, it has been proposed that aqueous soap solutions of various types be employed as selective solvents or extractants for such chemicals. Generally these "soap" solutions are not composed of soaps in the ordinary sense but are made up largely of relatively non-surface-active salts of alkali metals or equivalent salts derived from carboxylic acid mixtures having an average molecular weight ranging from about 115 to about 155. Solutions of this type are most conveniently prepared by adding the required amount of an aqueous caustic solution, or other suitable base, to the primary oil fraction produced in hydrocarbon synthesis whereby the free acids present in said fraction are neutralized. A substantial proportion of the oil-soluble chemicals, containing about 5 to 10 weight percent of hydrocarbons, is solubilized in the aqueous soap layer formed as a result of the neutralization step. The soap solution used for extraction purposes was prepared by subjecting the aqueous layer, containing the neutralized acids, chemicals and minor amounts of hydrocarbons, to a stripping operation in which substantially all of the chemicals and all of the hydrocarbons were taken overhead leaving a lean aqueous soap solution having a soap or salt content of the order of 20 to about 50 percent. In developing the use of these solutions as extractants for removing chemicals from such hydrocarbon solutions, it was found that narrower cuts of carboxylic acids, for example, the lower molecular weight acids obtainable from the aforesaid soap solutions, possessed a number of advantages over the use of the total soap solutions obtained as previously mentioned. For example, these selected soap solutions exhibited a lower affinity for hydrocarbons and also better stripping characteristics, in that they tended to foam less than the total soap mixtures that had been employed. These lower molecular weight soaps, generally derived from mixtures of carboxylic acids having from 2 to 6 carbons atoms, were prepared by subjecting the soap solution obtained in the aforesaid neutralization step to distillation, withdrawing a hydrocarbon free and substantially chemical free aqueous soap bottoms fraction, acidifying the latter with a strong mineral acid and then subjecting the liberated organic acids to fractionation. The $C_2$–$C_6$ acid fraction obtained from this operation was isolated and neutralized with caustic, or other suitable base, and then diluted with water to the desired strength, typically 30 to 40 weight percent. Notwithstanding the above mentioned advantages of the lower molecular weight soaps, the added expense of supplying the soap purge necessary to maintain purity of the circulating soap solution, i.e. the cost of isolating such an acid cut, neutralizing it and diluting it to the desired strength, was too high for economical operations. Accordingly, total soap mixtures were favored, notwithstanding certain drawbacks which they possessed, including their undesirable foaming tendency on stripping and higher affinity for hydrocarbons.

In practice, after the hydrocarbon synthesis oil had been extracted with a lean aqueous soap solution the resulting rich soap extract, containing oxygenated chemicals and hydrocarbons, was combined with the rich soap formed in the above mentioned neutralization step. These combined streams were then subjected to extraction under pressure with a low molecular weight liquid hydrocarbon such as, for example, liquid propane or liquid butane, for the purpose of removing from the soap solution any dissolved heavy hydrocarbons. The presence of heavy hydrocarbons, generally speaking, is undesirable since they lower the purity of the chemicals recovered from such solutions. This step, involving extraction of the chemical-rich soap solutions, is ordinarily referred to as "de-oiling" or the "de-oiling step." The raffinate from the de-oiling step consisted chiefly of soap solution containing oxygenated organic chemicals free of heavy hydrocarbons. This solution was thereafter fractionated under pressure to separate the light hydrocarbon solvent present, after which the soap solution was stripped free of chemicals in a conventional bubble cap still. The chemical distillate was then topped under a pressure of about 150 mm. to remove light chemicals, i.e., boiling below about 115° F. and containing primarily methyl ethyl ketone, methyl propyl ketone, and propanol. These light chemicals generally were sent back to the water-soluble chemicals plant operated in conjunction with the oil-soluble chemicals recovery plant, since the complex nature of this overhead rendered it very difficult to separate into its respective components by means of ordinary fractionation methods. If no such water-soluble chemical plant existed the aforesaid light chemicals usually had to be burned inasmuch as the cost for installing special equipment for separating this stream was not warranted. In plants of the size mentioned above, such overhead would amount to about 12,000 pounds per day.

The light hydrocarbon extract from the de-oiling step contained both high molecular weight hydrocarbons and relatively high molecular weight chemicals, particularly ketones and esters, and was generally sent to a solvent recovery column where the light hydrocarbon solvent, e.g., butane was removed overhead and returned to the de-oiling step. The bottoms from the butane recovery step consisted principally of heavy hydrocarbons and chemicals. It would be expected that the bottoms could be recycled and combined with the neutral oil fed to the soap extraction step. Under such conditions, however, a rather substantial buildup of chemicals, chiefly high molecular weight ketones and esters, occurred in the soap extractor and as a result it was found that these heavy chemicals tended to interfere with the efficiency of the de-oiling operation. Thus, in order for the de-oiling step to accomplish its purpose, it was found that larger and larger quantities of light hydrocarbon extract were required to produce a rich soap extract free of heavy hydrocarbons. To avoid this difficulty the bottoms from the butane recovery step, containing an appreciable quantity of chemicals, was withdrawn from the system and either discarded therefrom or separately processed to recover the chemicals and hydrocarbons as individual fractions.

Accordingly, it is an object of our invention to provide an efficient and practical process for recovering the above mentioned light chemicals from topping of soap stripper distillate and the heavy chemicals from the butane recovery step. It is another object of our invention to eliminate the expensive equipment required in the de-oiling steps associated with conventional soap extraction methods and thereby avoid attendant problems raised by the use of de-oiling procedures. It is a further object of our invention to provide conditions whereby the buildup of heavy nonsaponifiable materials, normally occurring in the soap extractant when employing conventional methods, is minimized.

Briefly, one embodiment of our invention is carried out by first neutralizing a hydrocarbon solution of carboxylic acids and other nonacid chemicals with a suitable base to produce an upper neutral oil layer and a lower aqueous layer consisting essentially of dissolved salts and nonacid chemicals together with a minor amount of hydrocarbons. The neutral hydrocarbon layer is next subjected to extraction with an aqueous soap solution derived from a carboxylic acid mixture having an average molecular weight ranging from about 85 to 115. The oil raffinate, which contains only a minor amount of chemicals, may be sent to further refining while the chemical-rich soap extract is subjected to a series of stripping steps. In the primary soap stripping operation a portion of the bottoms, i.e., lean soap, solution is returned to the extraction step while the remainder of this bottoms fraction is combined with the aforesaid aqueous phase and sent to a final or second stripping tower. The lean soap solution from this second stripping operation is essentially free of hydrocarbons and chemicals and is transferred to a suitable acid recovery system where corresponding acids of marketable quality are produced. The overhead from the primary soap stripping step contains nonacid chemicals, the majority of which are in the $C_2$–$C_6$ molecular weight range. This overhead is then combined with nonacid chemicals from the aforesaid second soap stripping operation and subjected to caustic oxidation where the chemicals are converted to salts of acids having essentially the same number of carbon atoms as the nonacid chemicals from which they were derived. After dilution to the proper extent with water, the resultant soap solution is used as makeup for the extraction process.

For a better understanding of our invention reference is made to the accompanying flow diagram in which, for example, the hydrocarbon phase from the Fischer-Tropsch synthesis is sent through line 2 at the rate of 37,400 pounds per hour to vessel 4. This hydrocarbon phase has the following composition: 24,200 pounds of hydrocarbons, 3,500 pounds of acids, 3,900 pounds of alcohols, 4,500 pounds of carbonyl compounds and 1,300 pounds of esters. Caustic, in the form of a 17 weight percent aqueous solution is injected into line 2 through line 6 at the rate of 7,100 pounds per hour. In settler 4 an upper neutral oil layer and a lower aqueous phase are formed. The neutral oil is discharged through line 8 into extraction tower 10 at the rate of 31,700 pounds per hour. The composition of this neutral oil stream is as follows: 23,700 pounds of hydrocarbons, 2,600 pounds of alcohols, 4,100 pounds of carbonyl compounds, and 1,300 pounds of esters. In extraction tower 10 the neutral oil travels upwardly and is countercurrently contacted with a descending stream of an aqueous soap solution containing between 30 and 40 weight percent of soaps prepared from a mixture consisting predominantly of $C_2$–$C_6$ acids. This aqueous soap extractant is introduced into the top of the extraction tower through line 11 at the rate of 79,400 pounds per hour. From the top of the tower a stream of raffinate oil is withdrawn through line 12 at the rate of 26,800 pounds per hour. This stream consists of 22,500 pounds of hydrocarbons, 1,100 pounds of alcohols, 2,300 pounds of carbonyls and 900 pounds of esters. Such a raffinate stream may be sent to further refining and is particularly suitable as feed to an isoforming operation where the oxygenated chemicals are converted into hydrocarbons.

The rich aqueous soap extract formed in the extraction operation is withdrawn through line 14 at the rate of 84,300 pounds per hour and sent to primary stripping tower 16. This rich soap extract has the following composition: 1,200 pounds of hydrocarbons, 1,500 pounds of alcohols, 1,800 pounds of carbonyl compounds and 400 pounds of esters. The balance of this stream consists of 47,700 pounds of water and 31,700 pounds of soap. In tower 16 the soap extract is subjected to fractionation under conditions such that the chemicals, the majority of which are in the $C_2$–$C_6$ molecular weight range, are taken overhead through line 18 and condenser 20. This is accomplished with a top tower temperature of about 295° F. at a pressure of 50 pounds per square inch gauge. The resulting distillate is used as a portion of the feed to the caustic oxidation step which will be referred to in detail below.

Referring again to the lower aqueous layer in settler 4, said layer is withdrawn therefrom at the rate of 12,800 pounds per hour through line 22 and then combined with a minor portion of the bottoms withdrawn from tower 16, which flows through line 30 and then through line 32 to line 22 to form the feed to secondary soap stripping tower 34. This feed is introduced at the rate of 28,700 pounds per hour and contains 550 pounds of hydrocarbons, 1,300 pounds of alcohols, 350 pounds of carbonyl compounds, and 50 pounds of esters, together with 150 pounds of additional chemicals present in the bottoms withdrawn from tower 16. The distribution of chemicals in said bottoms is about the same as indicated for line 22. Stripping tower 34 is operated at an overhead temperature of 294° F. at a pressure of 50 pounds per square inch gauge. A distillate is withdrawn therefrom through line 36 and cooler 38 at the rate of 2,400 pounds per hour. Stripped soap is taken from tower 34 through line 40 and sent to a suitable acid recovery system. The acids recovered from the soap in line 40 are in a relatively wide molecular weight range with the majority of such acids having from 4 to 12 carbon atoms.

The feed to the caustic oxidation step is made up of the nonacid chemicals in lines 42 and 44. A substantial portion of the feed to the aforesaid caustic oxidation step is derived from the recycled unconverted chemicals from the caustic oxidation process. The feed in line 46 enters heater 48 at the rate of 12,700 pounds per hour, where it is preheated to a temperature of about 490° F. Simultaneously, caustic in the form of an aqueous 86 weight percent solution is introduced through line 50 into heater 48 and likewise heated to a temperature of about 490° F. The caustic solution flows at the rate of 2,600 pounds per hour. These two hot streams are then separately added to reactor 52 which is operated at a temperature of about 600° F. and at a pressure of about 650 p.s.i. Mixing of the reactants is aided by the use of a motor-driven stirrer 54. In this reaction, free hydrogen is given off together with some methane derived from the reaction of caustic with methyl ketones. These gaseous reaction products, as well as unconverted chemicals and hydrocarbons, are taken overhead through line 56, cooler 58, and introduced into drum 60 where vapor and liquid phases are separated. Hydrogen and methane produced during the oxidation step are taken from separator 60 via line 66 and may be used for plant fuel. An organic layer is withdrawn from the separator drum through line 62 and a portion thereof, which contains unconverted nonacid chemicals, is recycled to oxidation reactor 52 via lines 64, 42 and 46. This recycle stream to the reactor flows at the rate of 5,550 pounds per hour. The remainder of the stream in line 62, flowing at the rate of 2,800 pounds per hour, flows through line 65 and joins the raffinate stream in line 12.

The lower aqeuous layer in separator 60 is continuously withdrawn through line 68 and combined with dilution water added to the system at the rate of 9,000 pounds per hour through line 70. These combined streams then join the liquid oxidation products (sodium salts of acids) withdrawn from reactor 52 through line 72 and the resulting mixture is then sent to primary stripping tower 16 via lines 74 and 14. The stream in line 74 amounts to 15,700 pounds per hour. While a portion of the acid salts withdrawn from reactor 52 through line 72 are drived from acids containing more than 6 carbon atoms, a major portion of the salts in line 72 is composed of acid salts derived from $C_6$ and lower molecular weight carboxylic acids. Accordingly, it is possible to use an overall acid salt mixture in the extraction system having a greater proportion of acid salts in the $C_2$–$C_6$ molecular weight range than normally occurs in the soap solutions obtained by neutralization of raw hydrocarbon synthesis oil. This high proportion of salts in the $C_2$–$C_6$ range results from the oxidation of the lighter chemicals which are preferentially removed from the oil by the soap. The average molecular weight of the acids used in making the soap extractant solution employed in our invention is about 91, whereas the average molecular weight of the acids represented in the soap solutions employed in conventional soap extraction processes amounts to about 126.

An alternate processing scheme, shown by dotted lines 76 and 78 in the accompanying diagram, involves combining the soap stream in line 22 with the rich soap extract in line 14 and ultimately using the resulting mixed soap as an extraction solvent. While this particular procedure admittedly does not take full advantage of the superior extraction characteristics possessed by the lower molecular weight soap produced through caustic oxidation, as pointed out above, it does have a number of alternative advantages. The caustic oxidation reaction can be facilitated by the use of an excess of caustic, e.g., 10 to 25 weight percent. By introducing an aqueous solution of the reactor product in line 72 into settler 4 via line 76, such excess caustic can be neutralized with the oil-soluble acids added through line 2, thereby effecting a savings in caustic and regeneration mineral acid costs. Also, by using the resulting combined soap streams in the soap extraction process, the residence time of soap in the extraction system is materially reduced. This reduces the concentration of heavy saponifiables in the circulating soap solution which result from polymerization of unsaturates, carbonyls, etc. The reduction in the nonsaponifiables content improves the purity of the product acids regenerated from the net soap make drawn off through line 40.

From the foregoing description it will be seen that our invention provides a method which materially increases the recovery of chemicals from hydrocarbon solutions over that accomplished by the conventional soap extraction process. Our invention also results in elimination of the de-oiling equipment required in the conventional soap extraction process. The elimination of the de-oiling equipment has the further advantage that it increases the amount of chemicals charged to the caustic oxidation step, resulting in a substantial increase in product chemical yields. For example, a conventional hydrocarbon synthesis plant producing 6,000 barrels of hydrocarbons per day would yield, with conventional soap extraction methods, about 81,000 pounds per day of oil-soluble acids and 67,000 pounds per day of alcohols. However, by operating in accordance with our invention, i.e. without de-oiling facilities, the quantity of recoverable chemicals could be increased to a total of 200,000 pounds of acids per day, using the same feedstock as employed in the aforesaid conventional soap extraction method. The additional quantity of acids produced by our invention in such a case, over the amount derived from the 67,000 pounds of alcohols, would be obtained from the low molecular weight nonacid chemicals removed by the soap extract topping step (chemicals of greater volatility than propanol among the chemicals in line 18 of the drawing) and from the high molecular weight nonacid chemicals removed by the de-oiling step, in the conventional extraction process, which streams normally are discarded.

We claim:

1. In a process for the removal of nonacid oxygenated organic chemicals from a hydrocarbon solution thereof by extraction of said solution with an aqueous solution of relatively nonsurface-active salts of carboxylic acids, the improvement which comprises subjecting said hydrocarbon solution to an extraction step with an aqueous solution of relatively nonsurface-active salts of carboxylic acids, said salts being prepared in a manner hereinafter described, subjecting the resulting chemical-rich aqueous salt extract to a stripping step to take overhead dissolved chemicals, subjecting the latter to caustic oxidation to produce carboxylic acid salts, forming an aqueous solution (1) of the last mentioned salts, combining solution (1) with the feed to said stripping step, withdrawing a lean aqueous salt solution from said stripping step, and employing a major portion thereof as the extractant in said extraction step.

2. The process of claim 1 in which the extractant employed in said extraction step is in the form of a 30 to 40 weight percent salt solution.

3. The process of claim 1 in which a portion of the unconverted chemicals from the caustic oxidation step is recycled and combined with the feed to said step.

4. The process of claim 1 in which the caustic used in said oxidation step is employed in approximately the amount stoichiometrically required to oxidize to acids the nonacid chemicals in the feed to said step.

5. In a method for the recovery of oxygenated organic chemicals, including carboxylic acids, from a hydrocarbon solution thereof wherein the acids in said solution are first neutralized with a water-soluble alkali metal compound to form an upper neutral oil layer containing dissolved nonacid chemicals and a lower aqueous phase containing dissolved salts of said acids, dissolved nonacid chemicals and a minor amount of dissolved hydrocarbons, the improvement which comprises subjecting said neutral oil layer to an extraction step with an aqueous solution of relatively nonsurface-active alkali metal salts of carboxylic acids, said salts being prepared in a manner hereinafter described, subjecting the resulting chemical-rich aqueous salt extract to a stripping step (1) to take overhead dissolved chemicals, withdrawing a lean aqueous salt solution as a bottoms stream from step (1), diverting a minor portion of said bottoms stream and combining it with said lower aqueous phase, thereafter subjecting the resulting mixture to a stripping step (2) to take overhead the chemicals present in said resulting mixture and leaving as bottoms a substantially chemical and hydrocarbon-free aqueous salt solution, combining the overheads from steps (1) and (2), subjecting this mixture of said overheads to caustic oxidation to produce carboxylic acid salts, forming a solution (1) of said carboxylic acid salts, combining solution (1) with said chemical-rich salt extract entering stripping step (1), and employing the undiverted portion of said lean aqueous salt solution as the extractant in said extraction step.

6. The process of claim 5 in which the caustic used in said oxidation step is employed in approximately the amount stoichiometrically required to oxidize to acids the nonacid chemicals in the feed to said step.

7. In a method for the recovery of oxygenated organic chemicals, including carboxylic acids, from a hydrocarbon solution thereof wherein the acids in said solution are first neutralized with a water soluble alkali metal compound to form an upper neutral oil layer containing dissolved nonacid chemicals and a lower aqueous phase containing dissolved salts of said acids, dissolved nonacid chemicals and a minor amount of dissolved hydrocarbons, the improvement which comprises subjecting said neutral oil layer to an extraction step with an aqueous solution of relatively nonsurface-active alkali metal salts of carboxylic acids, said salts being prepared in a manner hereinafter described, subjecting the resulting chemical-rich aqueous salt extract to a stripping step (1) to take overhead dissolved chemicals, withdrawing a lean aqueous salt solution as a bottoms stream from step (1), diverting a minor portion of said bottoms stream to a stripping step (2) to take overhead the chemicals present in said minor portion and leaving as bottoms a substantially chemical and hydrocarbon-free aqueous salt solution, combining the overheads from steps (1) and (2), subjecting this mixture of said overheads to caustic oxidation to produce carboxylic acid salts, said oxidation step employing caustic in an amount in excess of that stoichiometrically required to oxidize to acids the nonacid chemicals in the feed to said step, forming an aqueous solution (1) containing excess caustic and the carboxylic acid salts produced in said oxidation step, returning aqueous solution (1) to neutralize a fresh charge of said hydrocarbon solution, combining said lower aqueous phase with said chemical-rich salt extract, employing the undiverted portion of said lean aqueous salt solution as the extractant in said extraction step, and repeating the above cycle.

8. The process of claim 7 in which aqueous solution (1) contains from about 2 to about 5 weight percent free caustic and the extractant used in said extraction step has a carboxylic acid salt content of from about 30 to about 40 weight percent.

9. In a method for the recovery of oxygenated organic chemicals, including carboxylic acids, from a hydrocarbon solution thereof wherein the acids in said solution are first neutralized with a water-soluble alkali metal compound to form an upper neutral oil layer containing dissolved nonacid chemicals and a lower aqueous phase containing dissolved salts of said acids, dissolved nonacid chemicals and a minor amount of dissolved hydrocarbons, the improvement which comprises subjecting said neutral oil layer to an extraction step with an aqueous solution of relatively nonsurface-active alkali metal salts of carboxylic acids, said salts being prepared in a manner hereinafter described, combining said lower aqueous phase with the resulting chemical-rich aqueous salt extract from said extraction step and thereafter subjecting the resulting mixture to a stripping operation to take overhead dissolved chemicals, subjecting the chemicals in said overhead to caustic oxidation to produce carboxylic acid salts, said oxidation step employing caustic in an amount in excess of that stoichiometrically required to oxidize to acids the nonacid chemicals in the feed to said step, forming an aqueous solution (1) containing excess caustic and the carboxylic acid salts produced in said oxidation step, returning aqueous solution (1) to neutralize a fresh charge of said hydrocarbon solution, withdrawing from said stripping operation a bottoms fraction consisting essentially of lean aqueous salt solution, employing a portion of said lean aqueous salt solution as the extractant in said extraction step and repeating the above cycle.

10. The process of claim 1 in which the hydrocarbon solution is derived from hydrocarbon synthesis.

11. The process of claim 5 in which the hydrocarbon solution is derived from hydrocarbon synthesis.

12. The process of claim 7 in which the hydrocarbon solution is derived from hydrocarbon synthesis.

References Cited in the file of this patent

UNITED STATES PATENTS

| | | |
|---|---|---|
| 2,696,495 | Gromeans et al. | Dec. 7, 1954 |
| 2,810,740 | Grekel et al. | Oct. 22, 1957 |

FOREIGN PATENTS

| | | |
|---|---|---|
| 467,328 | Great Britain | June 15, 1931 |